(12) United States Patent
Marcu et al.

(10) Patent No.: US 9,384,373 B2
(45) Date of Patent: Jul. 5, 2016

(54) ADAPTIVE SIGNAL SCALING IN NFC TRANSCEIVERS

(75) Inventors: Cristian Marcu, San Francisco, CA (US); Jafar Savoj, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 215 days.

(21) Appl. No.: 13/282,328

(22) Filed: Oct. 26, 2011

(65) Prior Publication Data

US 2013/0109304 A1 May 2, 2013

(51) Int. Cl.
*H04B 5/00* (2006.01)
*G06K 7/00* (2006.01)
*G06K 19/07* (2006.01)

(52) U.S. Cl.
CPC .......... *G06K 7/0008* (2013.01); *G06K 19/0723* (2013.01)

(58) Field of Classification Search
CPC ...... H04B 5/0081; H04B 5/0075; H04B 5/02; H02J 7/025; H02J 5/005; H02J 1/14; H01F 38/14
USPC ........................ 455/41.1, 130, 193.1; 307/104
See application file for complete search history.

(56) References Cited

U.S. PATENT DOCUMENTS

| | | | | |
|---|---|---|---|---|
| 6,084,385 | A * | 7/2000 | Nair | G05F 1/575 323/273 |
| 7,260,371 | B1 | 8/2007 | Yones | |
| 8,134,410 | B1 * | 3/2012 | Zortea | H03G 3/001 330/284 |
| 2006/0197650 | A1 * | 9/2006 | Jones | B60R 25/24 340/5.61 |
| 2006/0238301 | A1 | 10/2006 | Wu et al. | |
| 2006/0273882 | A1 * | 12/2006 | Posamentier | 340/10.4 |
| 2007/0026825 | A1 * | 2/2007 | Wilson | 455/130 |
| 2007/0246546 | A1 | 10/2007 | Yoshida | |
| 2008/0143531 | A1 | 6/2008 | Tadokoro | |
| 2008/0245851 | A1 * | 10/2008 | Kowalski | G06K 7/10178 235/375 |
| 2008/0252459 | A1 * | 10/2008 | Butler | G06K 7/0008 340/572.1 |
| 2008/0268803 | A1 * | 10/2008 | Blin | 455/193.1 |
| 2009/0101716 | A1 * | 4/2009 | Mani | G06K 7/0008 235/441 |
| 2009/0109850 | A1 * | 4/2009 | Li | H04W 72/1242 370/235 |
| 2009/0291634 | A1 * | 11/2009 | Saarisalo | 455/41.1 |

(Continued)

FOREIGN PATENT DOCUMENTS

| | | |
|---|---|---|
| EP | 2330538 A1 | 6/2011 |
| EP | 2333932 A1 | 6/2011 |

(Continued)

OTHER PUBLICATIONS

Ghovanloo, et al., "Fully integrated wideband high-current rectifiers for inductively powered devices," IEEE Journal of Solid-State Circuits, vol. 39, No. 11, Nov. 2004, pp. 1976-1984.

(Continued)

*Primary Examiner* — Edward Urban
*Assistant Examiner* — Max Mathew
(74) *Attorney, Agent, or Firm* — Joseph Hanasz

(57) ABSTRACT

Exemplary embodiments are directed to adaptive signal scaling in NFC transceivers. A transceiver may include a programmable load modulation element configured for load modulation in a tag mode. Further, the transceiver may include a sensing element for measuring an amount of power harvested by the transceiver in the tag mode. The transceiver may also include a controller configured for adjusting a depth of load modulation of the programmable load modulation element depending on the amount of power harvested.

12 Claims, 13 Drawing Sheets

(56) References Cited

U.S. PATENT DOCUMENTS

| | | |
|---|---|---|
| 2009/0308937 A1 | 12/2009 | Yagi et al. |
| 2010/0079203 A1 | 4/2010 | Furutani |
| 2010/0291871 A1* | 11/2010 | Butler ................. G06K 19/0701 455/41.1 |
| 2011/0117863 A1 | 5/2011 | Camp, Jr. et al. |
| 2011/0210620 A1* | 9/2011 | Shinoda ................. H02J 5/005 307/104 |
| 2011/0259953 A1* | 10/2011 | Baarman ................. G01F 23/20 235/375 |
| 2011/0259960 A1* | 10/2011 | Baarman ................. G01F 23/20 235/385 |
| 2011/0287714 A1* | 11/2011 | Wilson ................. H04B 5/0075 455/41.1 |
| 2011/0309792 A1* | 12/2011 | Mochida ................. H02J 7/025 320/108 |
| 2012/0071088 A1* | 3/2012 | Cordier ............ G06K 19/07771 455/41.1 |
| 2012/0071090 A1* | 3/2012 | Charrat ............ G06K 19/07771 455/41.1 |
| 2012/0094599 A1* | 4/2012 | Takeyama ............... H01Q 1/243 455/41.1 |
| 2012/0106319 A1* | 5/2012 | Staring ................. H04L 69/22 370/216 |
| 2012/0170322 A1* | 7/2012 | Thomas ............ H02M 3/33569 363/16 |
| 2012/0196529 A1* | 8/2012 | Huomo ................. G06Q 20/045 455/41.1 |
| 2012/0293006 A1* | 11/2012 | Kim et al. ...................... 307/104 |
| 2013/0049674 A1* | 2/2013 | Davis ................. B60L 11/182 320/101 |
| 2013/0078914 A1* | 3/2013 | Royston et al. ............... 455/41.1 |
| 2013/0122803 A1* | 5/2013 | Forster ................... H04B 7/155 455/11.1 |
| 2014/0203758 A1* | 7/2014 | Moshfeghi ............... H02J 7/025 320/103 |

FOREIGN PATENT DOCUMENTS

| | | |
|---|---|---|
| JP | H10240889 A | 9/1998 |
| JP | 2007288718 A | 11/2007 |
| JP | 2010102701 A | 5/2010 |
| JP | 4591630 B2 | 12/2010 |
| WO | 0070552 A1 | 11/2000 |
| WO | WO2005045744 A1 | 5/2005 |
| WO | 2010035546 A1 | 4/2010 |

OTHER PUBLICATIONS

Guilar, et al., "A Full-wave rectifier for interfacing with multi-phase Piezoelectric energy harvesters," ISSCC 2008/Session 15/TD: Trends in Signal and Power Transmission/15.9, Feb. 5, 2008, pp. 302-303, 615.

ISO/IEC 18092 Information technology—Telecommunications and information exchange between systems—Near Field Communication—Interface and Protocol (NFCIP-1), First edition Apr. 1, 2004, 66 pages.

Masui, et al., "A 13.56MHz CMOS RF identification transponder integrated circuit with a dedicated CPU," 1999 IEEE ISSCC, Feb. 16, 1999, ISSCC99/Session 9/Papater TA 9.1, pp. 162-163.

International Search Report and Written Opinion—PCT/US2012/062286—ISA/EPO—Apr. 16, 2013.

Partial International Search Report and Written Opinion—PCT/US2012/062286—ISA/EPO—Feb. 4, 2013.

* cited by examiner

ADAPTIVE SIGNAL SCALING IN NFC TRANSCEIVERS

BACKGROUND

1. Field

The present invention relates generally to near field communication (NFC). More specifically, the present invention relates to NFC transceivers configured for adaptive signal scaling.

2. Background

Near Field Communication (NFC) is a wireless technology that can enable for short-range exchange of information between two or more devices. Devices capable of NFC can simplify presence-oriented transactions to enable for rapid and more secure exchange of information, for example, as in purchases for goods and services, or the exchange of information therein.

As a person skilled in the art will appreciate and understand, NFC technologies communicate over magnetic field induction, where at least two loop antennas are located within each other's "near field," effectively forming an air-core transformer that operates within a globally available and unlicensed radio frequency which, as indicated, is an industrial, scientific and medical (ISM) band of 13.56 MHz, with a band width of almost two (2) MHz.

In a conventional NFC system, a trade-off exists between adequate receiver sensitivity and protection from a large signal swing. Further, a trade-off exists between signal resolution and power harvesting during load modulation. A need exists for methods, systems, and devices for adaptive receive signal scaling and adaptive load modulation scaling within NFC systems.

DETAILED DESCRIPTION

Figure 1:
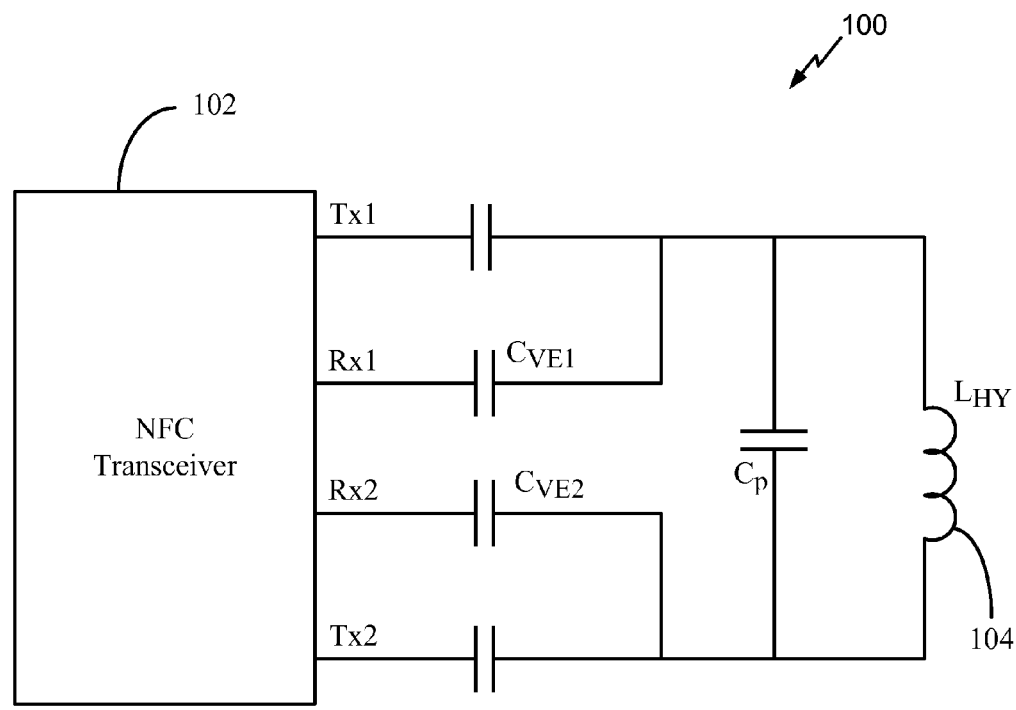
FIG. 1 illustrates a conventional NFC system.

The detailed description set forth below in connection with the appended drawings is intended as a description of exemplary embodiments of the present invention and is not intended to represent the only embodiments in which the present invention can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. It will be apparent to those skilled in the art that the exemplary embodiments of the invention may be practiced without these specific details. In some instances, well-known structures and devices are shown in block diagram form in order to avoid obscuring the novelty of the exemplary embodiments presented herein.

NFC is a communication standard that enables wireless communication devices, such as cellular telephones, SmartPhones, and personal digital assistants (PDAs) to establish peer-to-peer (P2P) networks. NFC may enable electronic devices to exchange data and initiate applications automatically when they are brought in close proximity, for example ranges from less than a centimeter to a distance of about 10 cm. As non-limiting examples, NFC may enable downloading of images stored in a digital camera to a personal computer, downloading of audio and video entertainment to portable devices, or downloading of data stored in a SmartPhone to a personal computer or other wireless device. NFC may be compatible with smart card technologies and may also be utilized to enable purchase of goods and services. In an exemplary embodiment, the frequency used for NFC is centered at about 13.56 MHz.

An NFC transceiver may include circuitry to impedance match to an antenna or other circuitry within a coupling element. The NFC transceiver may also include suitable logic, circuitry, processors, code, or combinations thereof to enable the reception and transmission of NFC signals, for which the carrier frequency of the received signal is in the NFC frequency band. Data may be modulated on the carrier frequency.

Conventional NFC may be based on Radio-Frequency Identification (RFID) technology that uses field induction to enable communication between electronic devices in close proximity. This can enable users to perform intuitive, safe, contactless transactions. Conventional state-of-the art NFC may operate at 13.56 MHz and transfers data at up to 424 Kbits/second. Of course, improvements to NFC technology may result in differing frequency(s), differing throughput values, or both. Communication between two or more NFC-compatible devices may occur when the devices are brought within a short distance from one another and maybe compatible with other known wireless technologies such as Bluetooth or Wi-Fi, for example.

Currently, there are two principal modes of operation available under present NFC standards: active and passive (i.e., powered by field). In active mode, a device may generate its own radio field to transmit data. In passive mode, one device may generate a radio field, while the other uses load modulation to transfer data. The passive mode of communication is often useful for limited power devices, such as mobile phones and PDAs, which need to minimize energy use. It may also prevent disruption of NFC communication when the device battery runs out.

In the various exemplary embodiments described herein, the term NFC is understood to encompass any now or future known wireless or near-proximity communication protocols or systems that facilitate the short-range wireless transfer of information, and is understood to not be limited to current standards or protocols promulgated by an NFC standards body or organization. Accordingly, NFC is understood to be applied herein as a generic sense of the term.

As will be understood by a person having ordinary skill in the art, an input signal to an NFC transceiver may have a large dynamic range. In conventional NFC devices, are large upper limit of the dynamic range may require placement of a voltage divider at the receiver input to protect the devices. However, a voltage divider may reduce receiver sensitivity for the lower limit of the dynamic range.

Further, a trade off exists between a depth of load modulation for an NFC transmitter in the tag mode trades and the total energy that a transceiver can harvest during the power-by-field (PBF) mode. The optimum depth of modulation can vary depending on the distance, data rate, and the mode of operation. It is therefore essential to identify the maximum modulation depth that can provide sufficient power for the tag to operate.

FIG. 1 is an illustration of a conventional NFC system 100 including an antenna 104 coupled to an NFC transceiver 102. NFC system 100 includes two additional receive pins at nodes Rx1 and Rx2, which operate as virtual grounds. Further, series capacitor CVE1 is coupled between antenna 104 and node Rx1 and series capacitor CVE2 is coupled between antenna 104 and node Rx2. Nodes Rx1 and Rx2, which act as virtual grounds, may receive an input current proportional to a voltage at antenna 104. As will be appreciated by a person having ordinary skill, NFC system 100 may exhibit reduced efficiency due to the voltage to current conversion. Further, NFC system 100 may require additional external components.

Figure 2:
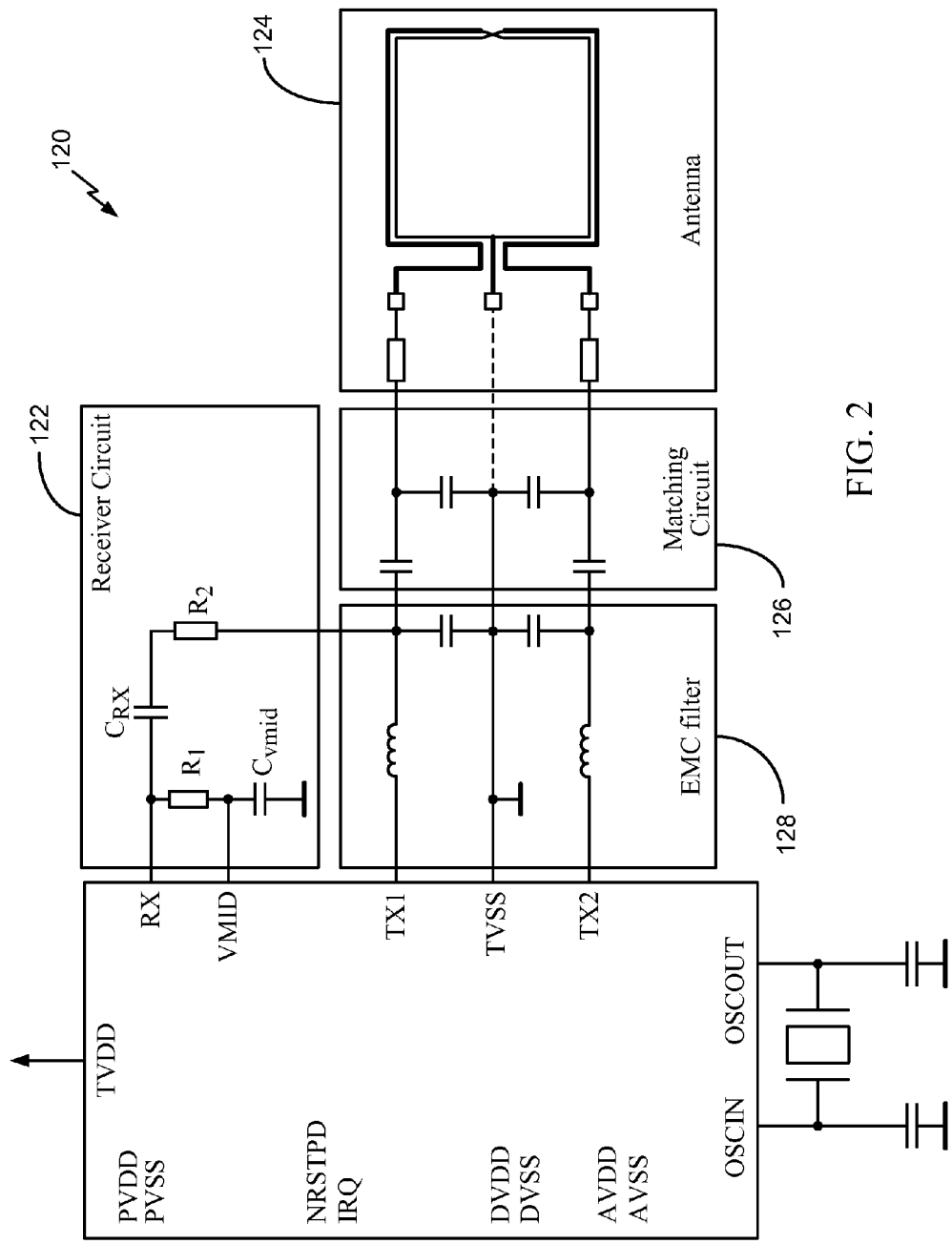
FIG. 2 illustrates another conventional NFC system.

FIG. 2 illustrates another conventional NFC system 120 including receiver circuitry 122, antenna 124, matching circuit 126, and EMC filter 128. Receiver circuitry 122 includes resistors R1 and R2, which together function as a voltage divider. Further, receiver circuitry 122 includes capacitor $C_{vmid}$, which together with resistor R1, function as a low-pass filter that detects the common-mode value of the input signal that serves as a reference for the signal sampler within the receiver. Although, the voltage divider provides protection for NFC system 120, the voltage divider has a fixed ratio and, therefore, is not suitable for operation over a wide dynamic range.

Exemplary embodiments of the present invention, as described herein, are related to an NFC transceiver, which is configured to adaptively scale the amplitude of a received signal to optimize receiver sensitivity while providing adequate device protection. Furthermore, the NFC transceiver may be configured for adaptive load modulation depth scaling for optimal signal resolution and power harvesting.

Figure 3:
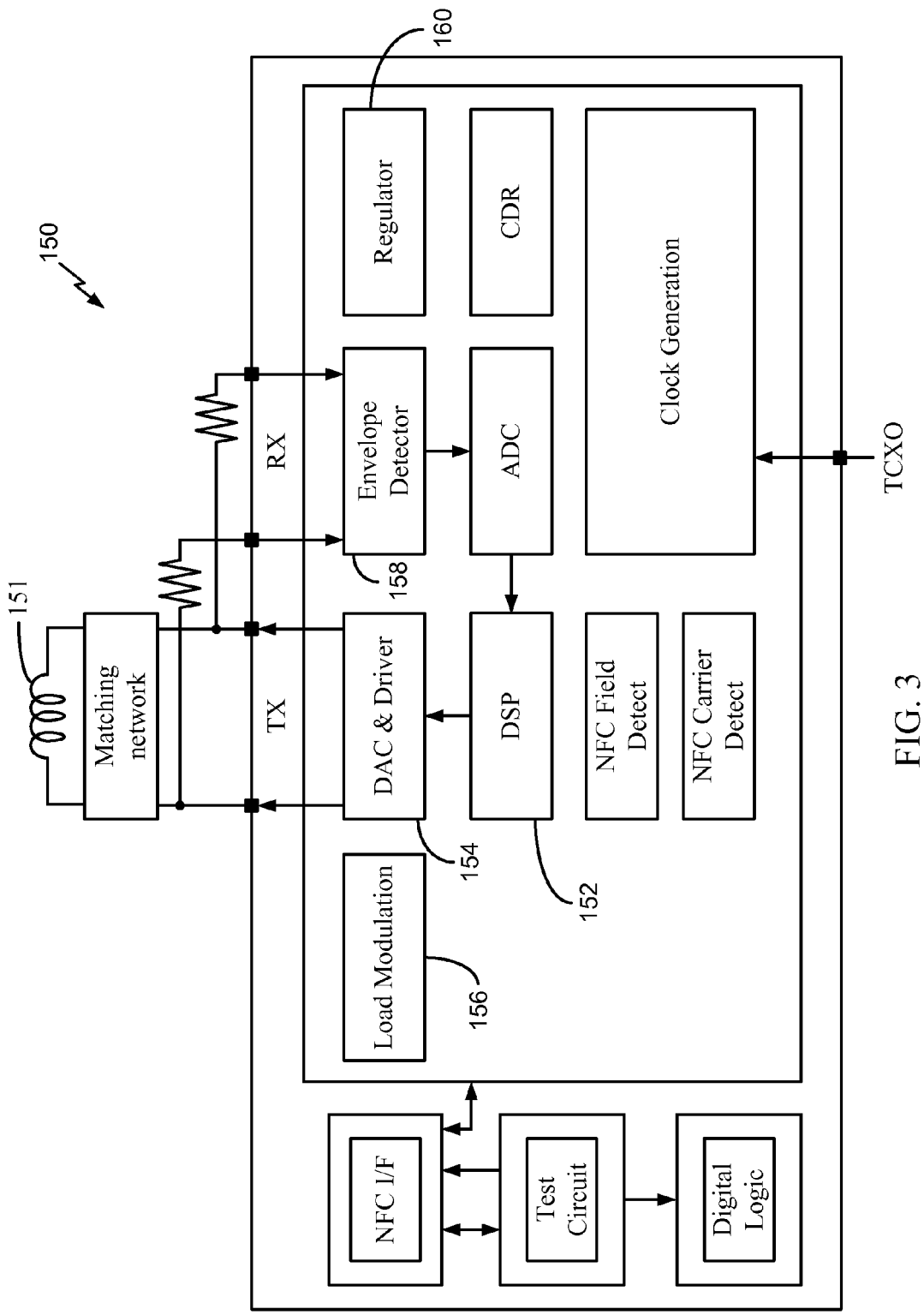
FIG. 3 is a block diagram of an NFC transceiver, according to an exemplary embodiment of the present invention.

FIG. 3 is a block diagram of an NFC transceiver 150, which is configured to support both active and passive modes, as mentioned above. NFC transceiver 150 includes, among other components, an antenna 151, a digital signal processor (DSP) 152, which is also commonly referred to as a baseband modem, a digital-to-analog converter (DAC) & driver module 154, and a load modulation module 156. It is noted that DAC and driver module 154 may be configured for load modulation and, thus, a separate load modulation module may not be required. NFC transceiver 150 further includes an envelope detector 158 and a regulator 160. Various components of NFC transceiver 150, such as envelope detector 158, DAC and driver module 154, and a regulator 160, will be discussed more fully below. It is noted that regulator 152 may comprise a rectifier that may be configured to convert an AC input signal to a DC signal. Further, a voltage at an output of the rectifier may be used to determine an amount of power being harvested by an associated transceiver (e.g. transceiver 150).

As will be appreciated by a person having ordinary skill in the art, if an amplitude of an input signal at an NFC transceiver is too high, the transceiver may be damaged. However, if the amplitude of the input signal it too low, the sensitivity of the transceiver may be inadequate.

Figure 4:
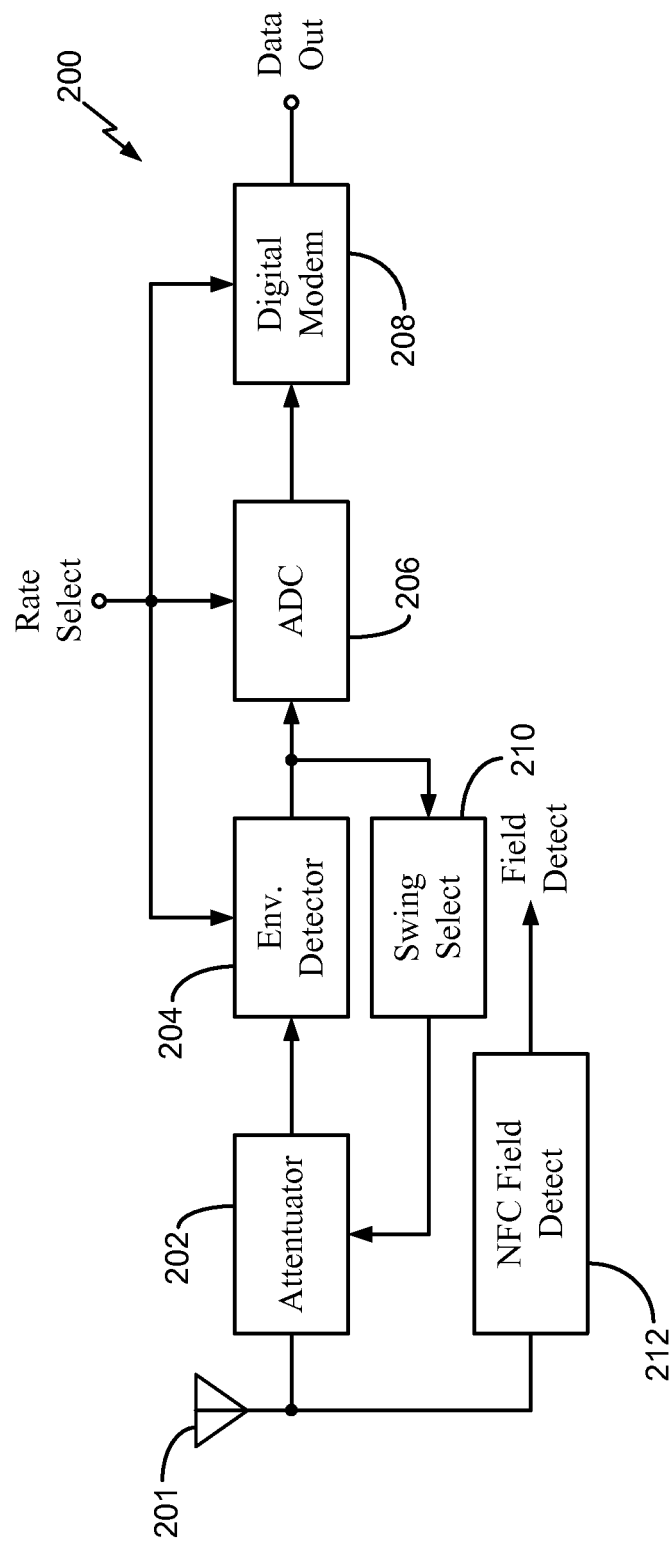
FIG. 4 is a block diagram of an NFC receiver, in accordance with an exemplary embodiment of the present invention.

FIG. 4 is a block diagram of an NFC receiver 200, in accordance with an exemplary embodiment of the present invention. NFC transceiver 200 includes an antenna 201, an attenuator 202, an envelope detector 204, an analog-to-digital converter 206, NFC field detect 212, and a digital modem 208. As illustrated in FIG. 4, attenuator 202 is coupled to and configured to receive an input signal from antenna 201. Further, envelope detector 204 is coupled to and configured to receive a signal output from attenuator 202. It is noted that attenuator 202 may also be referred to herein as an "adaptive attenuator," and "adjustable loss stage," or a "voltage divider." Moreover, as will be appreciated by a person having ordinary skill in the art, envelope detector 204 may be configured to sense an amplitude of the input signal. NFC transceiver 200 further includes a swing select 210 configured to receive an output of envelope detector and, in response thereto, convey one or more control signals to attenuator 202 for controlling (i.e., adjusting) an attenuation of attenuator 202. It is noted that swing select 210 may comprise a controller, a processor, digital logic, or the like. "Rate Select" adjusts the operation speed of the ADC depending on the mode of operation in order to achieve the best power efficiency.

Figure 5:
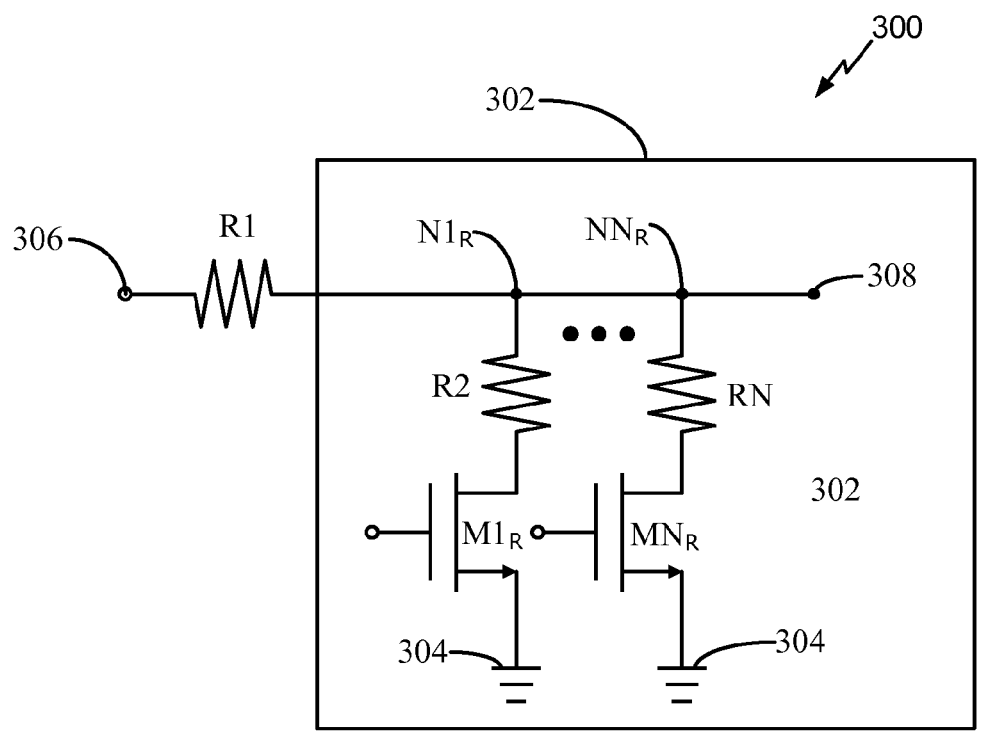
FIG. 5 illustrates an attenuator, according to an exemplary embodiment of the present invention.

FIG. 5 is one contemplated circuit diagram of an attenuator 300, according to an exemplary embodiment of the present invention. It is noted that attenuator 202, as illustrated in FIG. 4 may comprise attenuator 300 illustrated in FIG. 5. Attenuator 300, which comprises a resistive network, includes a first resistor R1, which is external to a chip 302. Furthermore, attenuator 300 includes one or more resistors R2-RN in a parallel configuration and integrated on chip 302. As illustrated in FIG. 5, resistor R1 may be coupled between an antenna (e.g., antenna 201 illustrated in FIG. 4) and chip 302, and may be in series with resistors R2-RN. Attenuator 300 may further include transistors $M1_R$ and $MN_R$. As will be appreciated by a person having ordinary skill in the art, transistor $M1_R$ is configured to provide a circuit path (i.e., a resistive path) from node $N1_R$ to ground voltage 304 while in a conductive state. Similarly, transistor $MN_R$ is configured to provide a circuit path (i.e., a resistive path) from node $NN_R$ to ground voltage 304 while in a conductive state. More specifically, each transistor (i.e., transistors $M1_R$-$MN_R$) is configured to receive a control signal (i.e., at a respective gate) from swing select 210 (see FIG. 4) and, in response thereto, may operate in either a conductive mode to provide a resistive path or non-conductive mode to provide an open circuit. Accordingly, the number of resistive paths within attenuator 300 is programmable and, thus, the attenuation ratio of attenuator 300 is programmable. It is further noted that attenuator 300 may be configured to receive an input 306 and convey an output 308.

Figure 6:
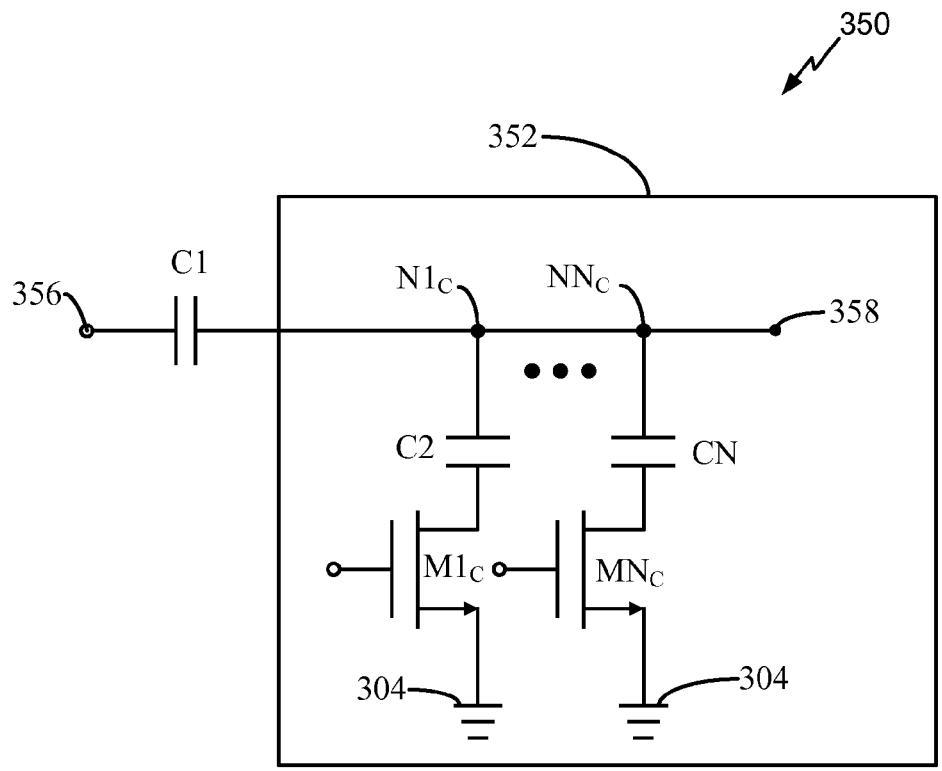
FIG. 6 illustrates another attenuator, according to an exemplary embodiment of the present invention.

FIG. 6 is a contemplated circuit diagram of another attenuator 350, according to an exemplary embodiment of the present invention. It is noted that attenuator 202, as illustrated in FIG. 4, may comprise attenuator 350 illustrated in FIG. 6. Attenuator 350, which comprises a capacitive network, includes a first capacitor C1, which is external to a chip 352. Furthermore, attenuator 350 includes one or more capacitors C2-CN in a parallel configuration and may be integrated on chip 352. As illustrated in FIG. 6, capacitor C1 may be coupled between an antenna (e.g., antenna 201 illustrated in FIGS. 4 and 5) and chip 352, and may be in parallel with capacitors C2-CN. Attenuator 350 may further include transistors $M1_C$ and $MN_C$. As will be appreciated by a person having ordinary skill in the art, transistor $M1_C$ is configured to provide a circuit path (i.e., a capacitive path) from node $N1_C$ to ground voltage 304 while in a conductive state. Similarly, transistor $MN_C$ is configured to provide a circuit path (i.e., a capacitive path) from node $NN_C$ to ground voltage 304 while in a conductive state. More specifically, each transistor (i.e., transistors $M1_C$-$MN_C$) is configured to receive a control signal (i.e., at a respective gate) from swing select 210 (see FIG. 4) and, in response thereto, may operate in either a conductive mode to provide a capacitive path or non-conductive mode to provide an open circuit. Accordingly, the number of capacitive paths within attenuator 350 is programmable and, thus, the attenuation ratio of attenuator 350 is programmable. It is further noted that attenuator 350 may be configured to receive an input 356 and convey an output 358.

Figure 7:
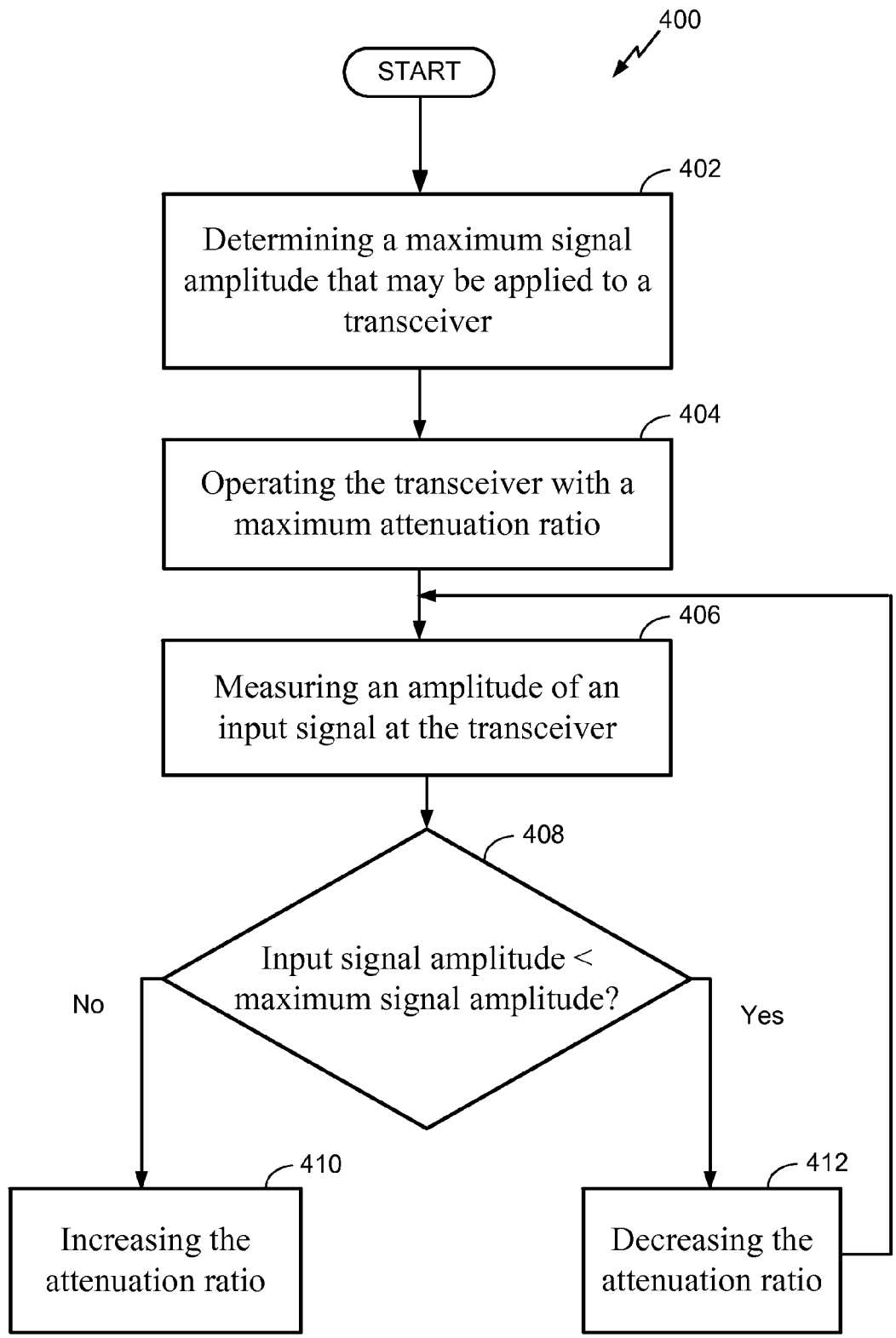
FIG. 7 is a flowchart illustrating a method, according to an exemplary embodiment of the present invention.

FIG. 7 is a flowchart illustrating a method 400, in accordance with one or more exemplary embodiments. Method 400 may include determining a maximum signal amplitude of an input signal that may be applied to a transceiver (depicted by numeral 402). It is noted that the maximum signal amplitude may be determined during a design stage of the transceiver, as will be appreciated by a person having ordinary skill in the art. Method 400 may also include operating the transceiver with a maximum attenuation ratio (depicted by numeral 404). Further, method 400 may include measuring an amplitude of an input signal at the transceiver (depicted by numeral 406). Further, step 408 of method 400 includes determining whether the input signal has an amplitude that is less than the maximum signal amplitude. If the amplitude of the input signal is less than the maximum signal amplitude, the attenuation ratio may be decreased (depicted by numeral 412), and method 400 may return to step 406. If the amplitude of the input signal is not less than the maximum signal amplitude, the attenuation ratio may be increased by one step (depicted by numeral 410).

Figure 8:
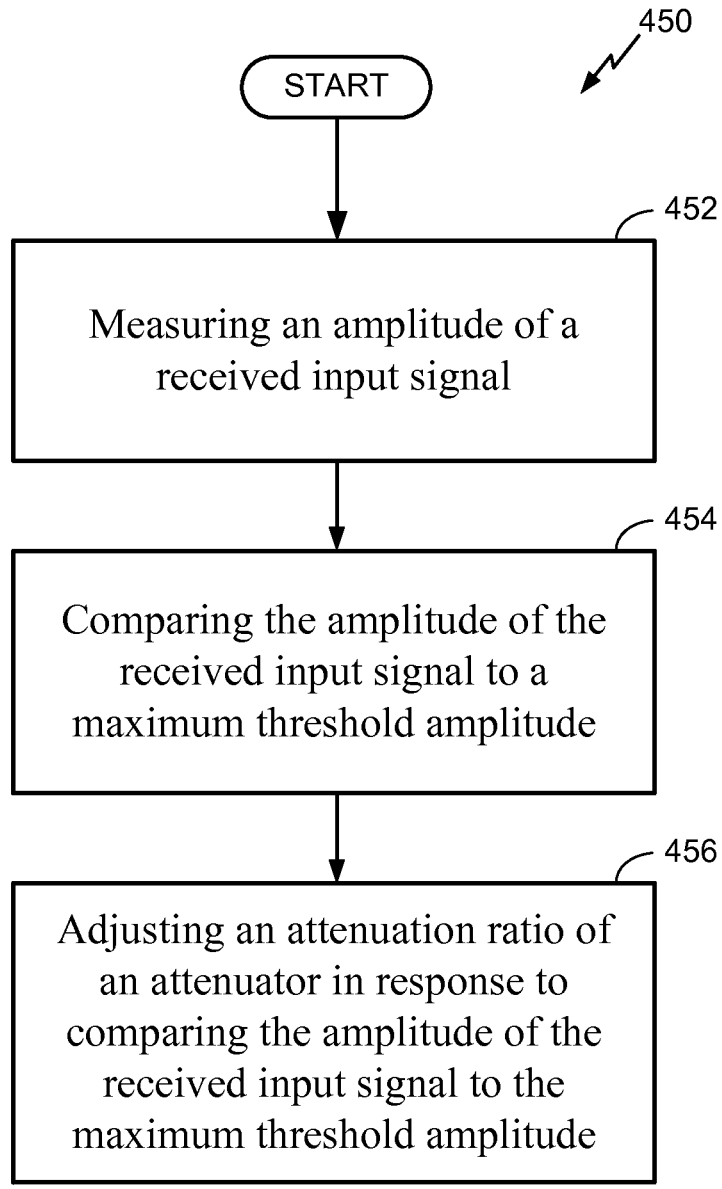
FIG. 8 is a flowchart illustrating another method, according to an exemplary embodiment of the present invention.

FIG. 8 is a flowchart illustrating a method 450, in accordance with one or more exemplary embodiments. Method 450 may include measuring an amplitude of a received input signal (depicted by numeral 452). Method 450 may also include comparing the amplitude of the received input signal to a maximum threshold amplitude (depicted by numeral 454). Further, method 450 adjusting an attenuation ratio of an attenuator in response to comparing the amplitude of the received input signal to the maximum threshold amplitude (depicted by numeral 456).

As will be appreciated, large depth load modulation by a tag simplifies data recognition by an initiator. However, larger load modulation depth may reduce the total energy harvested by the tag. According to another exemplary embodiment of the present invention, a transceiver may be configured to adaptively scale a depth of load modulation to provide for sufficient power harvesting while enabling a load modulation signal to be resolved at an initiator. Stated another way, exemplary embodiments of the present invention provide for a calibration mechanism, which maximizes a load modulation depth while enabling for an adequate amount of power to be harvested. Accordingly, various exemplary embodiments may utilize systems and devices to enable for programmable load modulation depths. With reference to FIGS. 9-14, a current digital-to-analog converter (DAC) will be described. Further, with specific reference to FIG. 14, programmable load modulation techniques, utilizing the current DAC, will be described.

Figure 9:
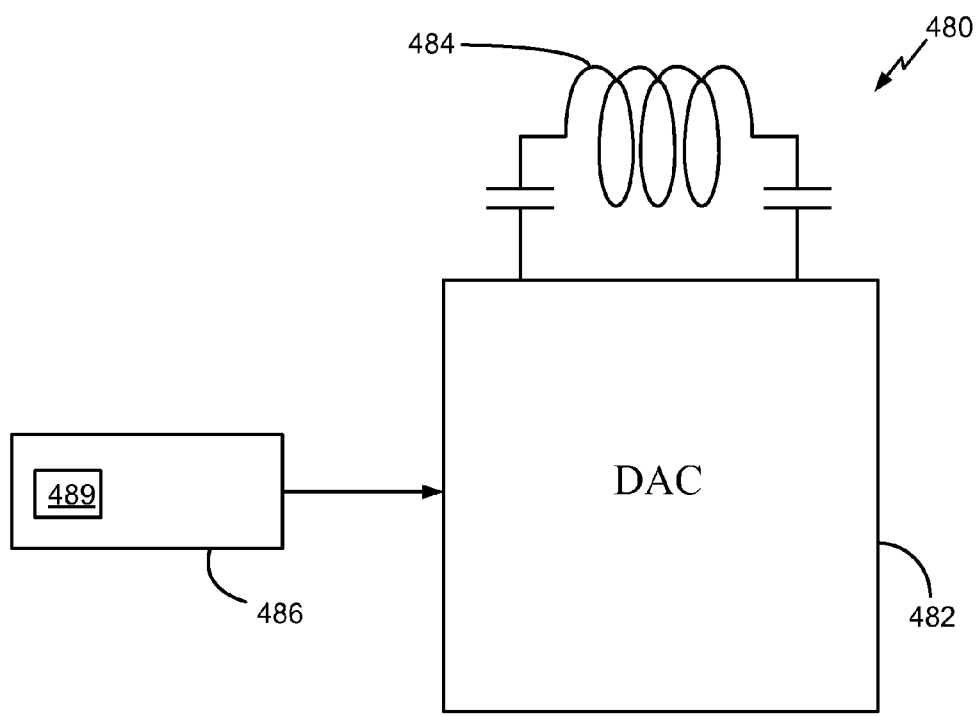
FIG. 9 illustrates an NFC system including a device comprising a current digital-to-analog converter (DAC) coupled to an antenna, in accordance with an exemplary embodiment of the present invention.

FIG. 9 illustrates a system 480 including a current digital-to-analog converter (DAC) 482, according to an exemplary embodiment of the present invention. It is noted that current DAC 482 may also be referred to herein as a "segmented DAC." Current DAC 482 is coupled to an antenna 484 and may be configured to receive one or more digital signals from a digital component, such as, for example only, a filter, such as a digital up-conversion (UPC) filter. Current DAC 482 may also be configured to receive one or more control signals from a control module 486, which may comprise, for example only, a processor, a controller, or the like. Control module 486 may comprise a mode selector 489 configured to determine whether system 480 should be in an active mode or a passive mode. Control module 486 may determine a mode (i.e., active or passive) of system 480 via one or more sensors, user input, or other suitable, known means. Upon determination of a mode, control module 486 may convey one or more control signals to current DAC 482 for controlling a configuration thereof It is noted that control module 486 may adjust the signal modulation, data rate, etc, based on the mode of operation.

Further, as described more fully below, current DAC 482 may be configured to drive a current into antenna 484. More specifically, in one operational mode (e.g., an active mode) current DAC 482 may be configured to convey a current directly to antenna 484 and, therefore, in comparison to conventional NFC transmitters, a separate driver may not be required.

It is noted that an antenna driver, which is implemented by current DAC 482, may produce a variety of signal modulations. Further, at finer process nodes (e.g., CMOS process nodes), UPC filters may be implemented by digital components without significant area and power penalty, resulting in ease of design and area reduction. More specifically, for example, an up-converter (UPC) and filters within system 480 may be implemented with digital components. It is noted that current DAC 482 may be operated at a multiple of 13.56 MHz for enhanced pulse shaping and, therefore, an electromagnetic compatibility (EMC) filter may not be required.

Figure 10:
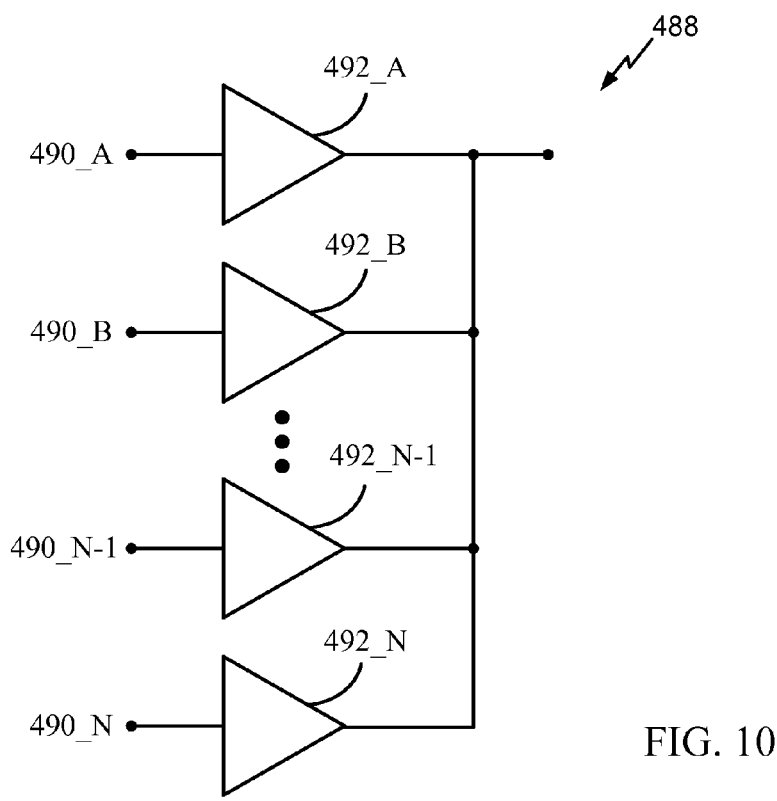
FIG. 10 illustrates an array of drivers within a digital-to-analog converter (DAC), according to an exemplary embodiment of the present invention.

FIG. 10 illustrates an array of drivers 488, which is an example of an array of drivers within current DAC 482. Each driver 492 (i.e., 492_A-492_N) includes an associated input 490 (i.e., 490_A-490_N) and, furthermore, array of drivers 488 includes an output 493. As will be understood by a person having ordinary skill in the art, a current DAC, such as current DAC 482, may include an array of drivers wherein each driver 492 includes one or more cells. For example, driver 492_A may include $2^0$ cells (i.e., one cell), driver 492_B may include $2^1$ cells (i.e., two cells), driver 492_N−1 may include $2^{(N−1)}$ cells (e.g., sixteen cells if N is equal to five), and driver 492_N may include $2^N$ cells (e.g., thirty-two cells if N is equal to five). It is noted that any number of drivers within an array of drivers is within the scope of the invention.

Figure 11:
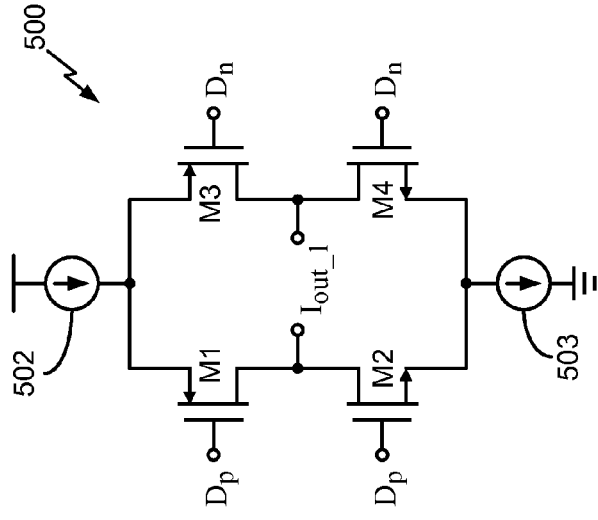
FIG. 11 illustrates a DAC cell including a low-voltage differential signaling (LVDS) driver, according to an exemplary embodiment of the present invention.
Figure 12:
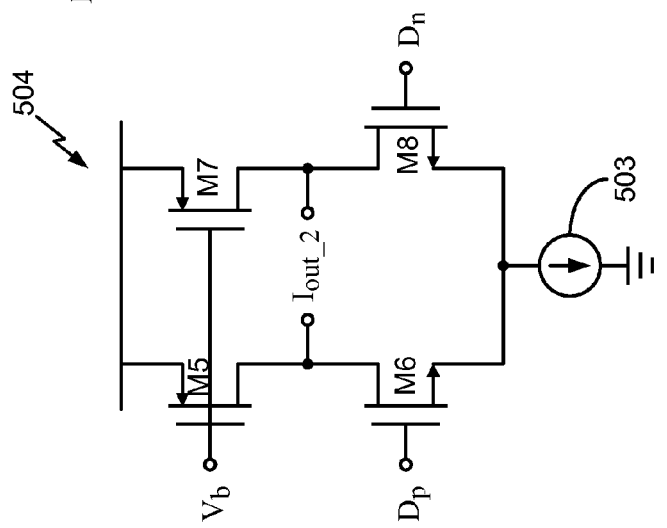
FIG. 12 illustrates another DAC cell including an LVDS driver, in accordance with an exemplary embodiment of the present invention.

FIG. 11 illustrates a DAC cell 500, according to an exemplary embodiment of the present invention. DAC cell 500 comprises a low-voltage differential signaling (LVDS) driver including a plurality of transistors M1, M2, M3, and M4 and current sources 502 and 503. As will be appreciated by a person having ordinary skill in the art, DAC cell 500 may be configured to receive input signals $D_p$ and $D_n$ from, for example, control module 486, and output a current $I_{out\_1}$. In a contemplated operation, the bias current is switched into the antenna according to the data input. It uses four MOS switches (M1-M4) in a bridged configuration. If switches M1 and M4 are on (Dp=0 & Dn=1), the polarity of the output current is positive. On the contrary, if switches M2 and M3 are on (Dp=1 & Dn=0), the polarity of the output current is negative. It is noted that the present invention is not limited to DAC cell 500 and other cells designs may be within the scope of the invention. For example, with reference to FIG. 12, a DAC cell 504 is illustrated. DAC cell 504 comprises a LVDS driver includes a plurality of transistors M5, M6, M7, and M8 and current source 503. As will be appreciated by a person having ordinary skill in the art, DAC cell 504 may be configured to receive input signals $V_b$, $D_p$ and $D_n$ from, for example, control module 486, and output a current $I_{out\_2}$. This configuration of DAC cell 504 allows the circuit to run from a lower supply, compared to a typical LVDS approach.

Figure 13:
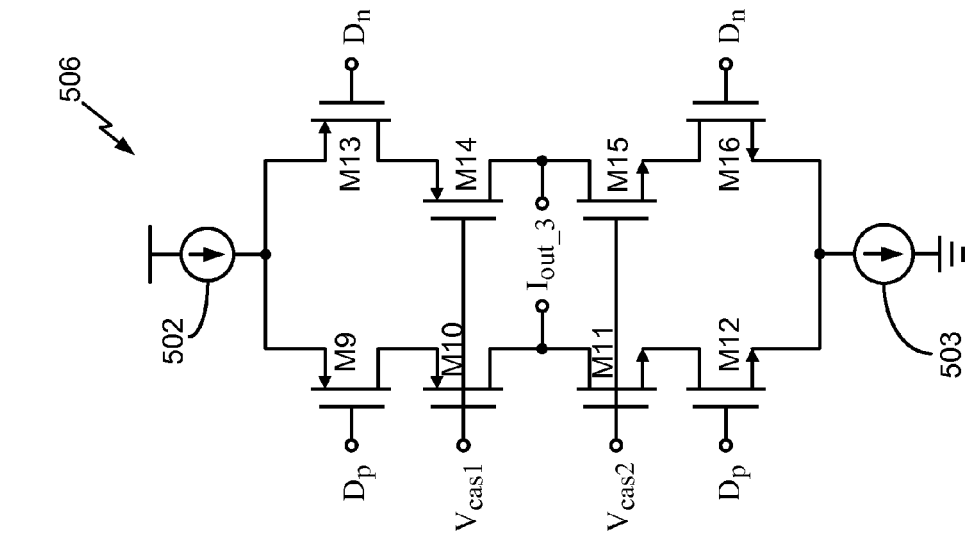
FIG. 13 illustrates another DAC cell including an LVDS driver, according to an exemplary embodiment of the present invention.

Another DAC cell 506, according to an exemplary embodiment of the present invention, is illustrated in FIG. 13. DAC cell 506 comprises a LVDS driver including a plurality of transistors M9, M12, M13, and M16 and current sources 502 and 503. Further, DAC cell 506 includes cascode devices M10, M11, M14 and M15. As will be appreciated by a person having ordinary skill in the art, a cascode device may improve stress related issues of DAC cell 506, especially at higher voltages (e.g., 1.8 volts). More specifically, cascode devices may provide added protection for devices by reducing the voltage drop across those devices. As will be appreciated by a person having ordinary skill in the art, DAC cell 506 may be configured to receive input signals $V_{cas1}$, $V_{cas2}$, $D_p$ and $D_n$ from, for example, control module 486 or an analog generation block, and output a current $I_{out\_3}$.

As will be appreciated by a person having ordinary skill in the art, a typical technique of NFC is the use of load modulation, in which a device varies a load impedance of its coil to change its resonant frequency and its quality factor Q. This action causes a voltage variation at another device (i.e., a device in an initiator mode).

Figure 14:
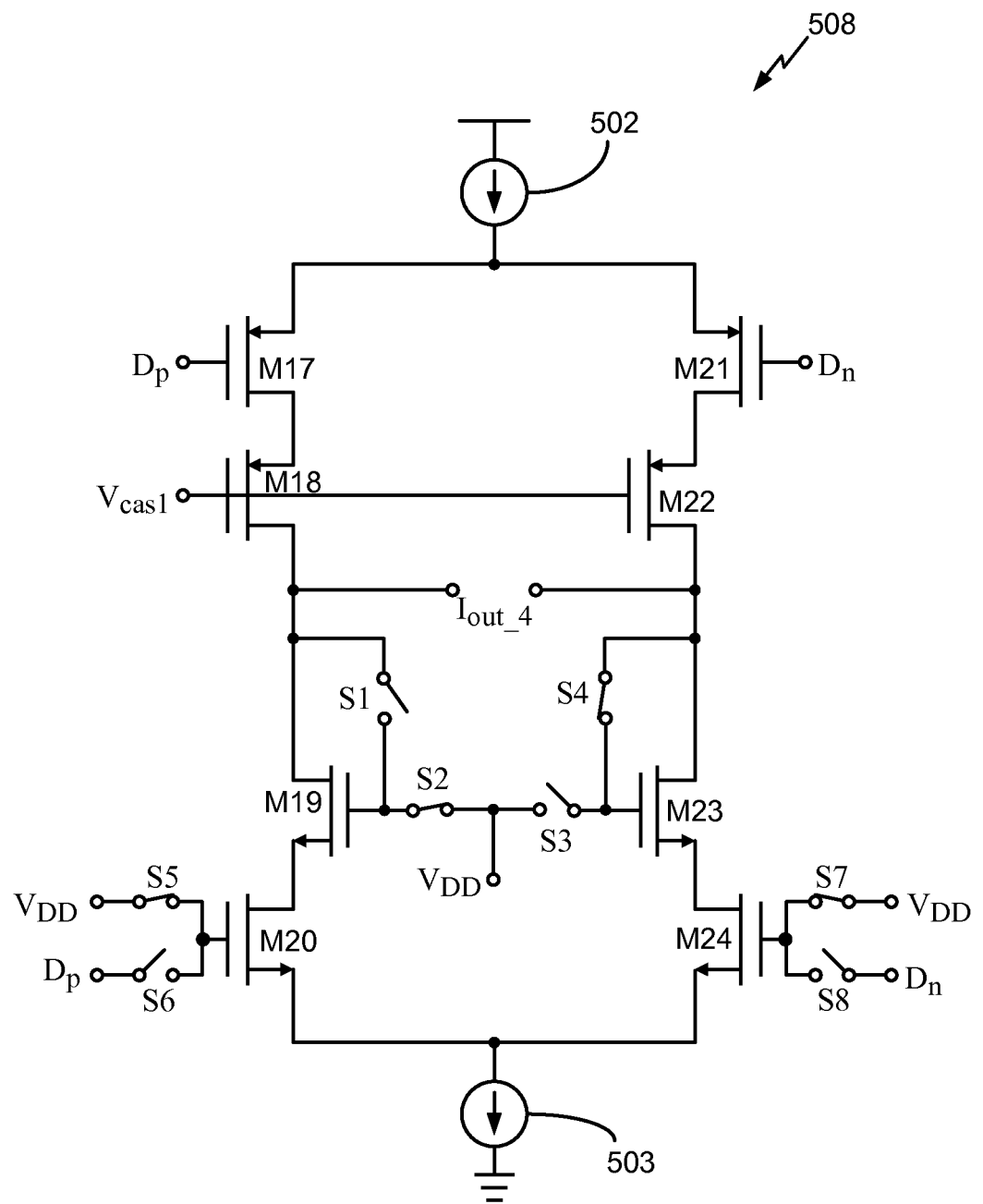
FIG. 14 depicts yet another DAC cell including an LVDS driver, according to an exemplary embodiment of the present invention.

In accordance with an exemplary embodiment of the present invention, a low-voltage differential signaling (LVDS) driver stage may be reconfigured with a plurality of switches to perform load modulation. Further, an array of LVDS cells, wherein at least one cell includes one or more switches, may enable for adjustment of the strength (i.e., a depth) of load modulation. Moreover, one or more LVDS cells may be configured to provide symmetry in load modulation. With reference to FIG. 14, a DAC cell 508 is illustrated. DAC cell 508 comprises a LVDS driver including a plurality of transistors M17, M19, M20, M21, M23, and M24 and current sources 502 and 503. Additionally, DAC cell 508 includes cascode devices M18 and M22, which, as noted above, may provide added protection for DAC cell 508. DAC cell 508 further includes a plurality of switches S1-S8, in accordance with an exemplary embodiment of the present invention. As will be appreciated by a person having ordinary skill in the art, DAC cell 508 may be configured to receive input signals $V_{cas1}$, $V_{DD}$, $D_p$ and $D_n$ from, for example, control module 486, output a current $I_{out\_4}$.

It is noted that in the configuration illustrated in FIG. 14 (i.e., switches S1, S4, S5, and S7 are closed and switches S2, S3, S6, and S8 are open), DAC cell 508 is in an active mode and, therefore, is adapted to drive a current into an associated antenna). In other contemplated configurations, DAC cell may provide load modulation. During load modulation, current sources 503 and 503 are each off. Further, when S2, S4, S5, and S7 are closed, the circuit effectively resembles a diode (formed by M23) and small resistances (formed by M19, M20, and M24). Effectively, if the voltage swing across the output nodes (Iout_4) is larger than one threshold (Vth), the path turns on and modulates the load. It is noted that the reason for placing a diode-connected devices, M23, is to introduce some hysteresis in the operation of the circuit. Similarly, cell 508 may be configured such that switches S1, S3, S5, and S7 are on and the rest of the switches are off. Accordingly, cell 508 may still operate in the load modulation mode but the polarity of the hysteresis is alternated. Further, if switches S2, S3, S6, and S8 are on and the rest of switches are off while current sources 502 and 503 are conducting current, then the driver cell operates in the active mode and drives current into the antenna. Further, during a passive mode, one or more of switches S1-S8 may be reconfigured to adaptively provide various levels of load modulation, as will be appreciated by a person having ordinary skill in the art.

Figure 15:
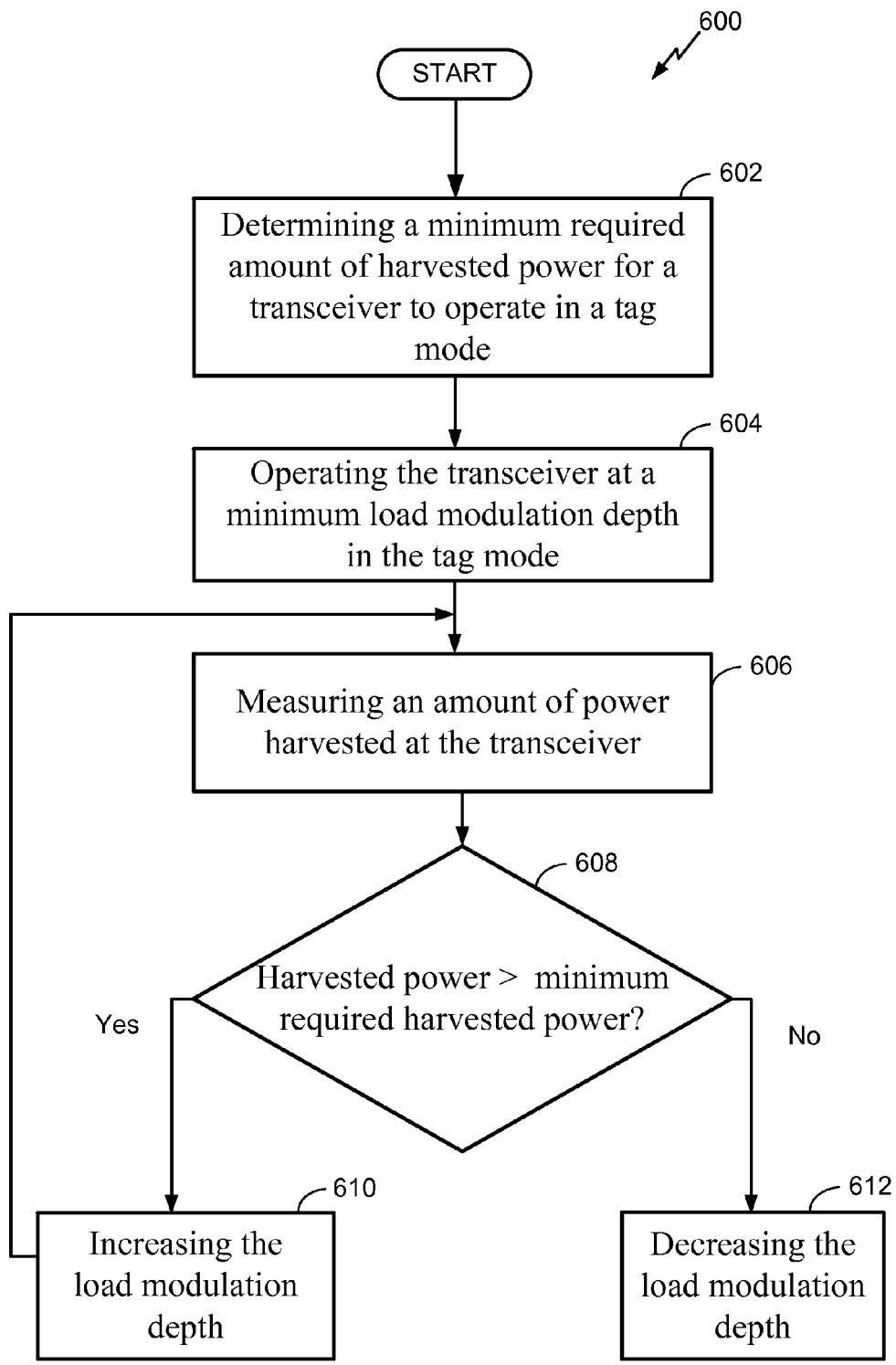
FIG. 15 is a flowchart illustrating another method, according to an exemplary embodiment of the present invention.

FIG. 15 is a flowchart illustrating a method 600, in accordance with one or more exemplary embodiments. Method 600 may include determining a minimum required amount of harvested power for a transceiver to operate in a tag mode (depicted by numeral 4602). It is noted that the minimum required amount of harvested power may be determined via simulation, as will be appreciated by a person having ordinary skill in the art. Method 600 may also include operating the transceiver at a minimum load modulation depth in the tag mode (depicted by numeral 604). Further, method 600 may include measuring an amount of power harvested by the transceiver (depicted by numeral 606). It is noted that the amount of power harvested may be determined by measuring an amount of power at an output of a rectifier. Further, step 608 of method 600 includes determining whether the amount of harvested power is greater than the minimum required amount of harvested power. If the harvested power is greater than the minimum required amount of harvested power, the load modulation depth may be increased (depicted by numeral 610), and method 600 may return to step 606. If the harvested power is not greater than the minimum required amount of harvested power, the load modulation depth may be decreased by one step (depicted by numeral 612).

Figure 16:
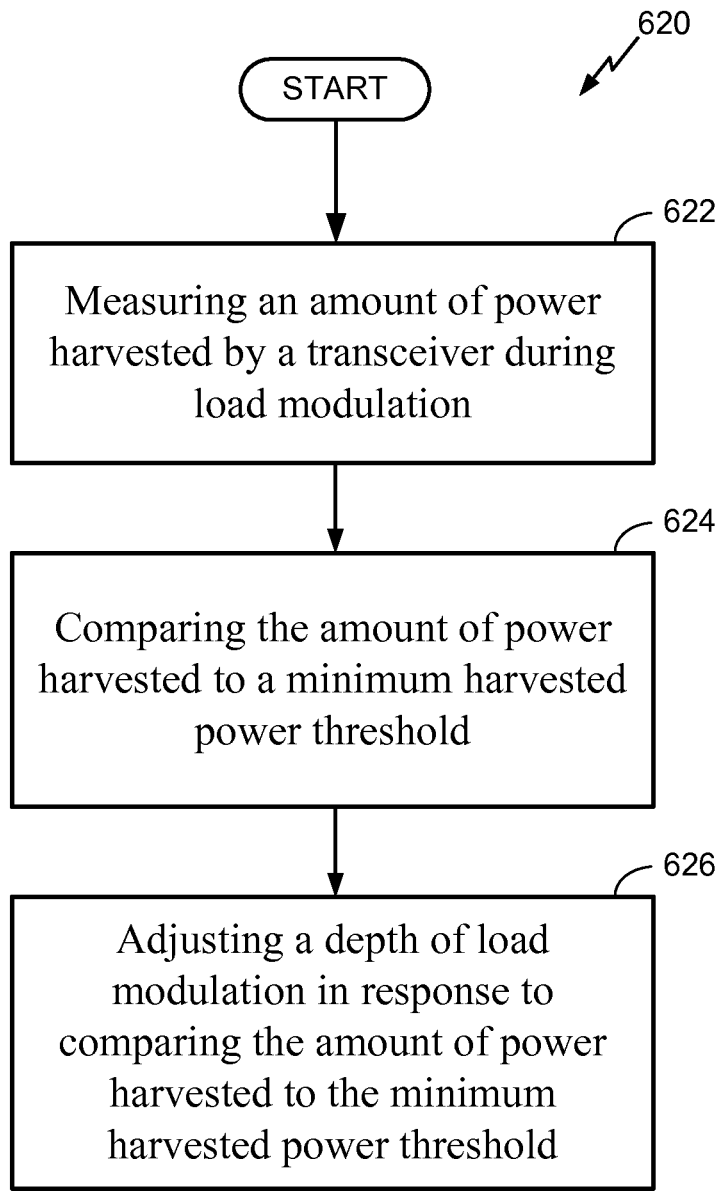
FIG. 16 is a flowchart illustrating yet another method, according to an exemplary embodiment of the present invention.

FIG. 16 is a flowchart illustrating a method 620, in accordance with one or more exemplary embodiments. Method 620 may include measuring an amount of power harvested by a transceiver during load modulation (depicted by numeral 622). Method 620 may also include comparing the amount of power harvested to a minimum harvested power threshold (depicted by numeral 624). Further, method 620 adjusting a depth of load modulation in response to comparing the amount of power harvested to the minimum harvested power threshold (depicted by numeral 626).

Figure 17:
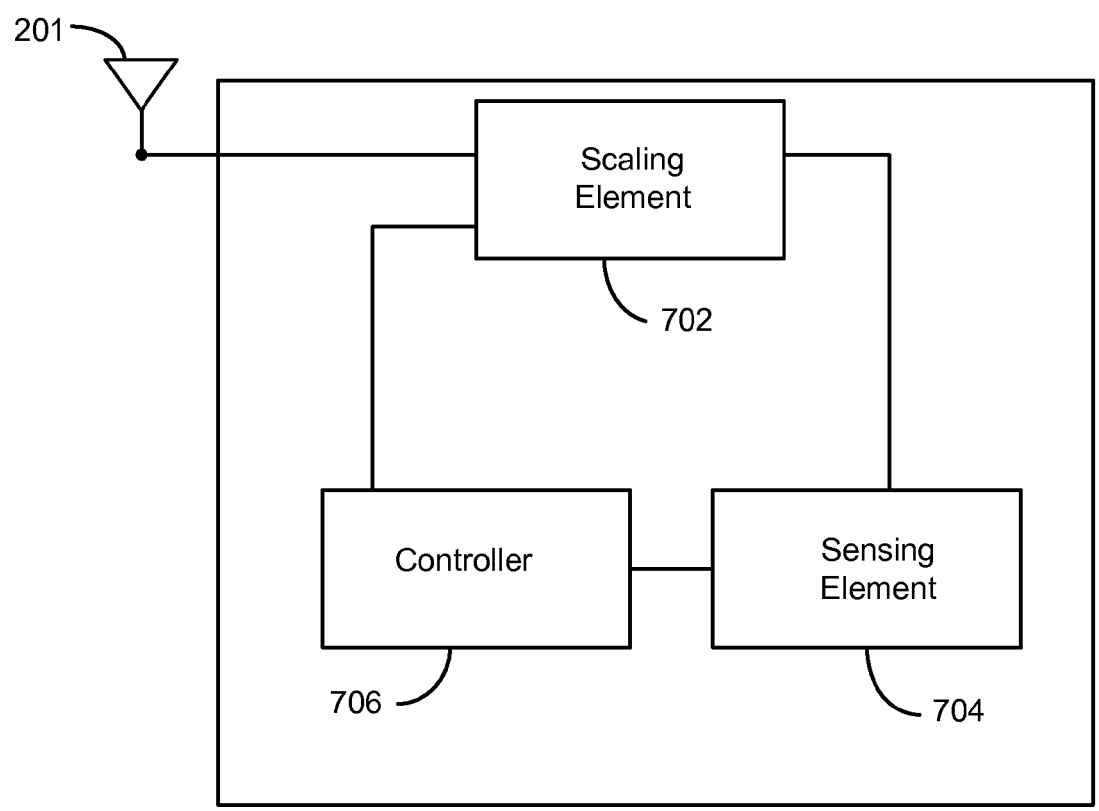
FIG. 17 depicts an NFC transceiver, according to an exemplary embodiment of the present invention.

FIG. 17 is a block diagram of a NFC transceiver 500, in accordance with one or more embodiments of the present invention. As illustrated, NFC transceiver 500 includes antenna 201, a scaling element 702, a sensing element 704, and a controller 706. According to one exemplary embodiment, scaling element 702 comprises a programmable load modulation element (e.g., current DAC 482 including a plurality of DAC cells 508) and sensing element 704 comprises a rectifier. In this exemplary embodiment, controller 706 may be configured to receive one or more signals from sensing element 704, compare data (i.e., measured data) from sensing element 704 to stored data (i.e., threshold data) and convey one or more control signals to scaling element 702 for controlling operation thereof According to another exemplary embodiment, scaling element 702 comprises an attenuator (e.g., attenuator 202) and sensing element 704 comprises an envelope detector (e.g., envelope detector 204). In this exemplary embodiment, controller 706 may be configured to receive one or more signals from sensing element 704, compare data (i.e., measured data) from sensing element 704 to stored data (i.e., threshold data) and convey one or more control signals to scaling element 702 for controlling operation thereof Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof Those of skill would further appreciate that the various illustrative logical blocks, modules, circuits, and algorithm steps described in connection with the exemplary embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

The various illustrative logical blocks, modules, and circuits described in connection with the exemplary embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the exemplary embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the exemplary embodiments shown herein but is to be accorded the widest scope consistent with the principles and novel features disclosed herein.

What is claimed is:

1. A transceiver, comprising:
   a programmable load modulation element configured for load modulation in a tag mode;
   a sensing element for measuring an amount of power harvested from an adaptively attenuated input signal by the transceiver in the tag mode, the adaptively attenuated input signal varying in response to comparing an amplitude of the adaptively attenuated input signal to a maximum threshold amplitude; and
   a controller coupled to each of the programmable load modulation element and the sensing element and configured to:
     compare the measured amount of power harvested to a minimum harvested power threshold; and
     adjust a depth of load modulation of the programmable load modulation element depending on the comparison of the measured amount of power harvested to the minimum harvested power threshold.

2. The transceiver of claim 1, the programmable load modulation element comprising a current digital-to-analog converter (DAC).

3. The transceiver of claim 1, the sensing element comprising a rectifier.

4. The transceiver of claim 1, the controller further configured to increase the depth of load modulation if the measured amount of power harvested is greater than the minimum harvested power threshold.

5. The transceiver of claim 1, the controller further configured to decrease the depth of load modulation if the measured amount of power harvested is less than the minimum harvested power threshold.

6. A method, comprising:
   measuring an amount of power harvested from an adaptively attenuated input signal by a transceiver during load modulation, the adaptively attenuated input signal varying in response to comparing an amplitude of the adaptively attenuated input signal to a maximum threshold amplitude;
   comparing the measured amount of power harvested to a stored minimum harvested power threshold; and
   adjusting a depth of load modulation to depending on the comparison of the
   measured amount of power harvested to the stored minimum harvested power threshold.

7. The method of claim 6, the measuring an amount of power harvested comprising measuring an amount of power at an output of a rectifier.

8. The method of claim 6, the adjusting comprising adjusting the depth of load modulation with one or more drivers of a current DAC.

9. A device, comprising:
   means for measuring an amount of power harvested from an adaptively attenuated input signal by a transceiver during load modulation, the adaptively attenuated input signal varying in response to comparing an amplitude of the adaptively attenuated input signal to a maximum threshold amplitude;
   means for comparing the measured amount of power harvested to a stored minimum harvested power threshold; and
   means for adjusting a depth of load modulation depending on the comparison of the measured amount of power harvested to the stored minimum harvested power threshold.

10. A transceiver, comprising:
    an adaptive scaling element;
    a sensing element coupled to the adaptive scaling element and configured to sense at least one parameter of the transceiver; and
    a controller coupled to each of the adaptive scaling element and the sensing element and configured to:
       compare the sensed at least one sensed parameter to a minimum harvested power threshold; and
       adaptively scale a load modulation depth depending on the comparison of the at least one sensed parameter to the minimum harvested power threshold.

11. The transceiver of claim 10, the adaptive scaling element comprising an attenuator and the sensing element comprising an envelope detector.

12. The transceiver of claim 10, the adaptive scaling element comprising a programmable load modulation element and the sensing element comprising a rectifier.

\* \* \* \* \*